United States Patent [19]

Wenning et al.

[11] Patent Number: 6,122,565
[45] Date of Patent: Sep. 19, 2000

[54] PRESS PRODUCTION MONITORING SYSTEM AND METHOD

[75] Inventors: Nathan P. Wenning, Coldwater; Daniel A. Schoch, Minster, both of Ohio

[73] Assignee: The Minster Machine Company, Minster, Ohio

[21] Appl. No.: 09/027,009

[22] Filed: Feb. 19, 1998

Related U.S. Application Data

[60] Provisional application No. 60/037,740, Feb. 20, 1997.

[51] Int. Cl.[7] .................................................. G06F 19/00
[52] U.S. Cl. ........................ 700/206; 700/117; 700/249; 700/277; 700/121; 19/219; 19/248; 419/49; 419/68; 269/107; 269/297.4
[58] Field of Search ..................................... 700/249, 250, 700/277, 278, 279, 280, 205, 117, 121, 206–210; 19/219, 248; 38/44–62; 264/107, 297.4; 419/49, 68; 425/406–410

[56] References Cited

U.S. PATENT DOCUMENTS

| | | | |
|---|---|---|---|
| 4,030,868 | 6/1977 | Williams | 425/149 |
| 4,491,833 | 1/1985 | Schoneberger | 340/721 |
| 4,639,881 | 1/1987 | Zingher . | |
| 4,770,590 | 9/1988 | Hugues et al. | 414/172 |
| 4,853,946 | 8/1989 | Elliott et al. . | |
| 5,094,107 | 3/1992 | Schoch | 73/570 |
| 5,260,878 | 11/1993 | Luppy | 700/174 |
| 5,448,902 | 9/1995 | Thoms et al. . | |
| 5,564,298 | 10/1996 | DeMeo | 72/19.8 |

FOREIGN PATENT DOCUMENTS

| | | | |
|---|---|---|---|
| 0 617 392 A1 | 3/1994 | European Pat. Off. | G08C 17/00 |
| 0 727 313 A1 | 2/1996 | Germany | B41F 33/00 |
| 58061999 | 4/1983 | Japan | B30B 15/10 |

Primary Examiner—Paul P. Gordon
Assistant Examiner—Ramesh Patel
Attorney, Agent, or Firm—Randall J. Knuth

[57] ABSTRACT

A press monitoring system includes an electronic processor for accessing a communication network connected to the processor. A sensor is used for measuring a desired quality of the press connected to the electronic processor. The processor sends the communication network corresponding to the measured quality. A remote unit connected to the communication network is adapted to accept the signal from the electronic processor, and to display the measured quality of the press, whereby the press may be monitored remotely during a production run.

28 Claims, 7 Drawing Sheets

| Command | Purpose/Function |
|---|---|
| [DISPLAY] | Starts the section of the configuration file that defines the screen output format during the data acquisition process |
| Format= | Defines the screen output as Text or Graphics |
| [FILES] | Starts the section of the configuration file that defines the Data File name and other related factors |
| Logger_File= | Defines the name of the file that will contain the GuardDog raw data |
| AutoIndexIncrement= | When ON, the software will automatically switch to a new raw data filename every midnight |
| AutoConditionIncrement | When ON, the software will automatically switch to a new set of conditions and filenames every week (Saturday midnight) |
| [TRIGGERS] | Starts the section of the configuration file that will contain information related to initiating data acquisition and serialization |
| AutoStartOnBoot= | When ON, the software will automatically start when the computer starts, and will begin acquiring data as per the parameters in the configuration file |
| LogTrigger= | Defines the trigger mechanism for serializing data. The following options are possible: TIMER, PERCENT_CHANGE, FAULT, and RUNTIME. These options can be combined with the "OR" keyword. |
| [TIMERS] | Starts the section of the configuration file that will contain information related to data acquisition and event timers and setups |
| LogTimer= | Defines the length in time (seconds) between the serialization of data points |
| PeakTimer= | Defines the length in time (milliseconds) between peak detection acquisitions (i.e. unsaved test samples) |
| [SERVICES] | Starts the section of the configuration file that will contain information on the types of data acquisition services that will be provided by the Software |

Fig. 3A

| Command | Purpose/Function |
|---|---|
| Temperatures= | When ON, thermocouple, thermistor, and/or RTD temperature data is acquired, analyzed, and evaluated according to the parameters specified in the [Temperature] section |
| Strain_Gages= | When ON, strain data is acquired, analyzed, and evaluated according to the parameters specified in the [Strain_Gages] section. |
| SCXI_Voltage_Inputs= | When ON, general voltage inputs will be acquired and evaluated according to the parameters specified in the [SCXI_Voltage_Inputs] section. |
| Counters= | When ON, event counter inputs will be acquired and evaluated according to the parameters specified in the [Counters] section. Typically, event counter inputs include press speed evaluations and part counting. |
| PeakHold_Inputs= | When ON, general voltage inputs will be acquired and evaluated according to the parameters specified in the [PeakHold_Inputs] sections. |
| Device_Voltage_Inputs= | When ON, general voltage inputs will be acquired and evaluated according to the parameters specified in the [Device_Voltage_Inputs] section. |
| Vib_Inputs= | When ON, vibration data will be acquired and evaluated according to the parameters specified in the vibration monitoring software |

Fig. 3B

All inputs and outputs of the system must run through the CFaultFilter object. Once a fault is detected, a CFault object is created. The CFault object then takes appropriate action (as determined by the GuardDog Configuration Settings).

PRESS PRODUCTION MONITORING SYSTEM AND METHOD

This application is a continuing application of Provisional Application No. 60/037,740 filed Feb. 20, 1997.

BACKGROUND OF THE INVENTION

1. Field of the Invention

The present invention relates to a press monitoring system and more particularly, a press monitoring system that may transmit and receive commands from a remote site communication network.

2. Description of the Related Art

Presently, press manufacturers have a need to understand how their press machines, such as stamping and drawing presses and the like, operate in a production environment. Normally there is no dedicated test press that is solely for research and development, in that press or machine tool manufacturers typically built a machine and then immediately sell and ship the machine. Such business practices do not permit development of data related to long term operation of machines.

Additionally, periodic visits by the machine manufacturer aren't sufficient to gain information on how the machine is operating on a daily basis. Further, it would be beneficial to obtain detailed information on how a prototype machine is operating in the field. There is a concern and use for further information on the use of the machine or press by the customer or manufacturer for other reasons.

Excessive warranty repair is sometimes developed on misuse of such machines. It would be beneficial to monitor such misuse of the machine, and furthermore, to identify problems before they lead to an effect on production efficiencies. Furthermore, there is a need for information on how new features and systems of the machine are used, as in how often is a particular option turned on or off and/or operated with the overall machine.

There is a need for the ability to give additional service to customers, such in identifying particular uses of the machine and identifying conditions when particular elements may be degraded without the customer knowing such element is about to fail. Items, such as bearings going bad, valves not operating correctly, or different particular systems running either too hot too cold, too high or too low would be monitored in a perfect world. By having more information, it would be possible to send service personnel to identify the problem and reduce production downtime by immediately solving such problems on a controlled basis. Furthermore, preventive maintenance could be monitored and controlled.

What is needed in the art, is a machine monitoring system, such as for a press, that would constantly monitor the press during production, particularly monitoring the press twenty-four hours and day, seven days a week and transmit such data to a remote site.

SUMMARY OF THE INVENTION

The present invention provides a system and method of monitoring a machine such as a stamping or drawing press during production use, twenty four hours a day, seven days a week. Additionally, such monitoring may be conducted at a remote site through a communication network, such as the telephone system or the Internet. The new system monitors functions and parameters of the press separate from the actual press controls, therefore the system may be adapted to presses from many different manufacturers. The present invention incorporates a philosophy of strictly monitoring the press and controlling the data thereby developed so as there is no tie into the machine operation either mechanically or electrically. Therefore, the present system does not disturb the machine setup or machine control.

An advantage of the present system is that data collected from the press during production is able to be sent to a remote site for analysis. The system also incorporates the functionality of that the remote site may reconfigure both the hardware and software of the monitoring device, located adjacent to the press or machine, via the communication network. Additionally, such remote site is able to reconfigure the monitor to change the measurement criteria and also change particular limits and programmed variables. Additionally, the system is able to trap and control any and all specimen faults (i.e., a measurement out of range from a predetermined limit condition), hardware faults, and software faults.

Another advantage of the present invention is that the local monitoring system may place a signal to on-site machine service personnel via facsimile, personal pager, or other mobile or off-site communication means. It is foreseen that particular pagers, including vibrators, may be activated by the signal sent from the local monitoring platform.

Another advantage of the present invention is that it incorporates a plurality of monitoring criteria, which are user selectable in different input-output cards (I/O Cards). Some of the sensors utilized are connected to the monitoring system box and attached to particular portions of the press. These I/O cards condition the signal from the sensors to develop a signal in a format that is acceptable for input into the computer processor of the invention.

Another advantage of the present invention is that it permits variable data logging schemes to be utilized, depending upon a users command. This includes the ability to reconfigure data logging depending on particular time periods wanted, selectable alarms, monitoring of logging only when requested, or a number of different parameters as shown on the software configuration file.

Another advantage of the present invention is that it utilizes a communication network between the local monitoring system and the remote unit. Such communication system may include a telecommunications network, such as telephone line, cellular phone, internet access, ATM transfer, and other protocols for transmitting data to and from the remote site. Additionally, and more simply, a serial cable may connect between the local site and remote site, or utilization of even other protocols, such as local area networks, or wide area networks, as are known in the art may be used to transfer data thereover.

The invention, in form thereof, provides an electronic processor, along with a means for accessing a communication network connected to the processor. A sensor for measuring a desired quantity of the press is connected to electronic processor and capable of sending a signal thereto. An electronic processor is adapted to send a signal or through communication network corresponding to the measured quality. The remote unit is connected to the communication network, with the remote unit adapted to accept the signal from the electronic processor and to display the measured quality of the press, whereby the press may be monitored remotely during the production one of the press. In one form of the invention, the electronic processor includes memory means for storing the value of signals received from the sensor over a period longer than 24 hours.

The invention, in another form thereof, comprises a method of monitoring a press during production, the method includes the steps of providing an electronic processor and a sensor for respectively acquiring data and measuring a desired quality of a press; providing access to a communication network, connected to the remote unit for displaying an indication of the measured quality of the press. The method also includes the steps of measuring the desired quality of the press, then operating the electronic processor to send a signal over the communication network representative of the measured quality of the press, whereby the remote unit receives the signal. In one form of the invention, the method may also include the step of causing the remote unit to send a signal through the communication network to the electronic processor to command the electronic processor to change its rate of acquiring data or some other function.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIGS. 3A and 3B are listings of particular local software commands which indicate particular functionality of the device that may be set from the local software configuration file.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
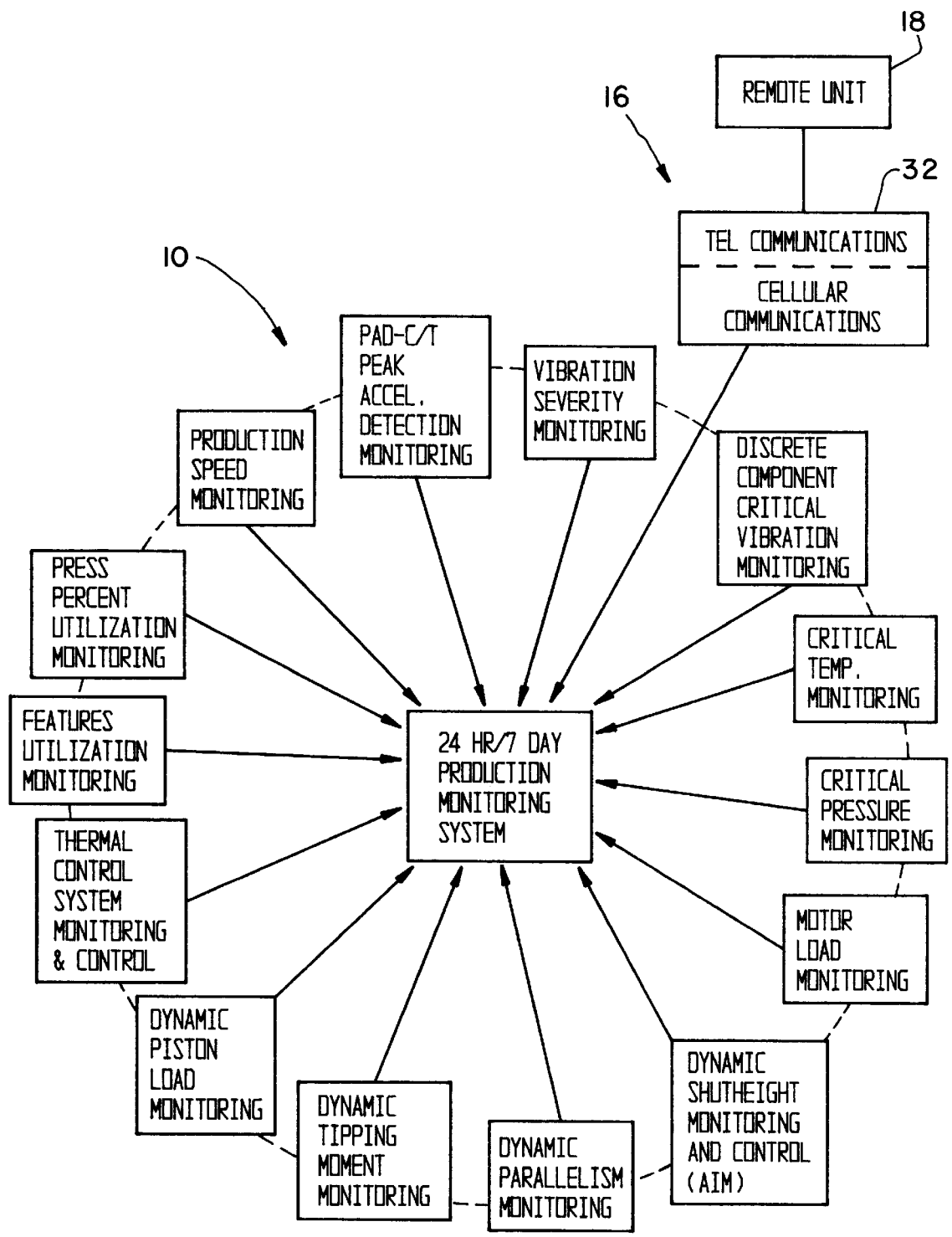
FIG. 1 is a functional flow chart of the present invention.
Figure 2:
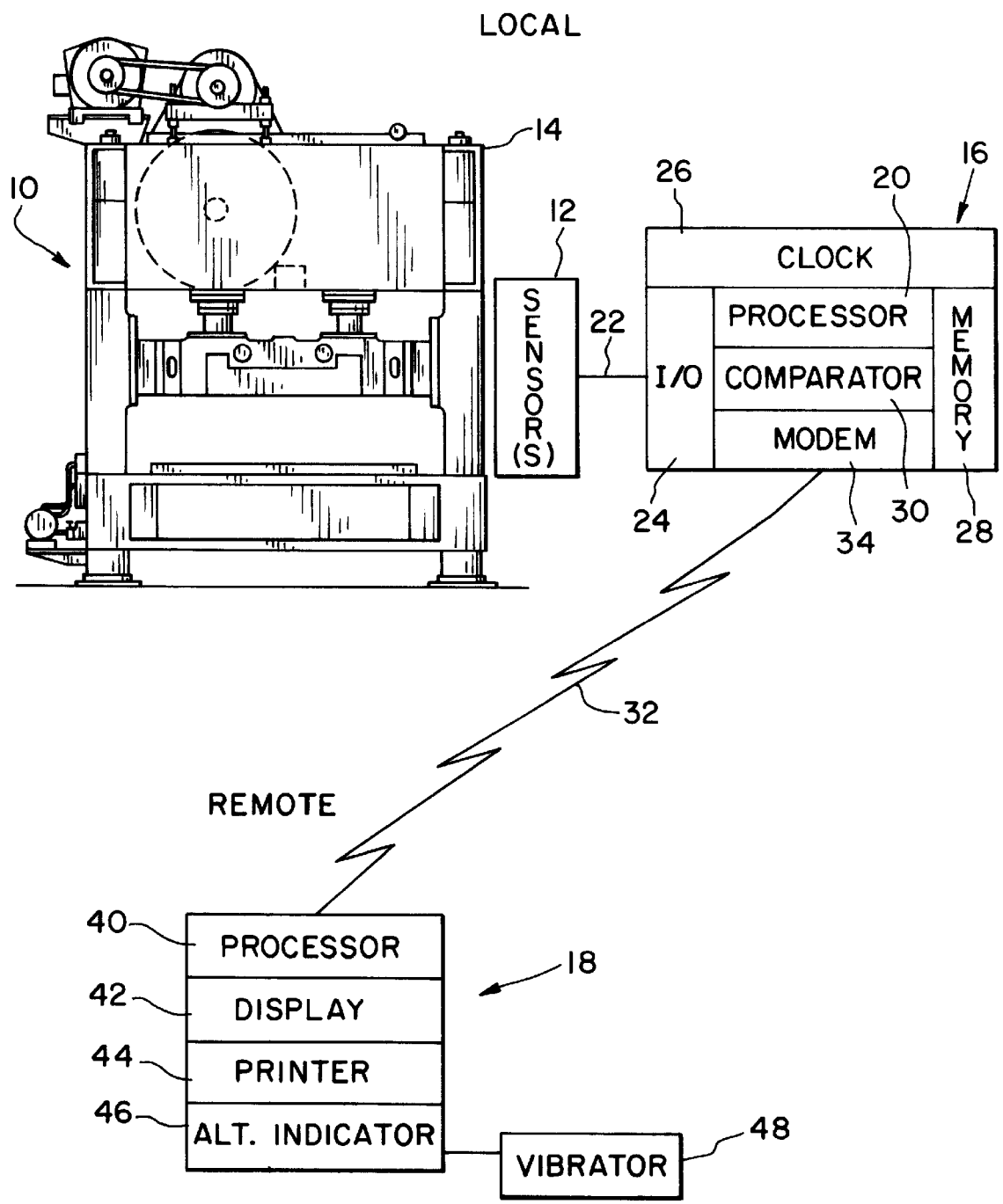
FIG. 2 is a diagrammatic view of the press monitoring system of the present invention showing both the local and remote units.

The present invention as shown in FIGS. 1 and 2 discloses functionality and hardware apparatus of the present invention. The press production monitoring system 10 of the present as shown in FIG. 2 includes at least one sensor 12 monitoring a desired quality of a machine, such as a press 14. Preferably more than one sensor 12 is utilized. Sensors 12 may include various types of machine monitoring equipment, such as accelerometers, temperature sensors, voltage or current sensors, stroke counters, pressure monitors, load monitors, inductive type probes, timers, infrared measurement devices, velocity indicators, and almost any other type of sensor that may measure a quality of press 14. System 10 is comprised of a local unit 16 and a remote unit 18.

Local unit 16 comprises a hardened monitoring system including an electronic processor 20. In the present invention, the processor may be that of a hardened personal computer, such as a IBM compatible 486 or PENTIUM based programmable computer. Additionally, such electronic processor 20 may include hardware or software configured programmable logic controllers (PLC's) and numerous other types of electronic computation and processing equipment.

Sensor 12 is connected to local unit 16 via a signal line 22 that passes the signals developed by sensor 12 to a input/output sub-system or board 24. Input/output board 24 may comprise a signal conditioning system or amplification system for utilizing the sensor output received on line 22 and changing that signal into a format useful to processing by the processor 20. For example, if sensor 12 happens to be a temperature sensor, the output through line 22 may comprise a DC local signal. I/O board 24 may then be, for example a National Instruments SCXI-1001 32-channel multiplexer for conditioning that received DC level voltage signal to a numerical signal for use by processor 20. Communications between I/O boards 24 and the processor 24 may be organized by, for example, a National Instruments SCXI-1001 mainframe, which act as a backbone between one or more I/O boards 24 and a typical ISA bus utilized with processor 20. Local unit 16 further includes a clock or timer means 26 for creating timing signals for both I/O boards 24, along with processor 20. Processor 20 is operationally connected to a memory means, such as memory unit 28. Memory unit 28 may be one of a variety types of memory systems conventionally available now or in the future, such as particular RAM memory, hard drive memory, tape, writable CD-ROM, or other such memory units on which signals may be stored and retrieved. Additionally, further connected to processor 20 is a comparator means, such as a comparator circuit 30 either connected to or operationally disposed within electronic processor 20. Comparator 30 is used for comparing between two values or signals and generating a output signal based on such comparison. Local unit 16 further includes a means for accessing a communication network 32, such as a modem 34.

Although in the preferred embodiment of the invention, the means for accessing a communication network 32 is that of a modem operationally connected to processor 20, other various types of means for accessing a communication network 32 may be utilized, depending upon the communication network 32.

Various types of communication networks 32 may be utilized, such as a dedicated phone line, a call-up telephone line, cellular phone system, wireless network system, internet access system, ATM transfer system, along with other types of protocols for transmitting data to and from remote site 18. Depending upon the type of communication network 32 utilized, that may change the type of means or accessing such communication network 32. Additionally, the communication network 32 may be that of a local area network, wide area network, and/or simply a serial cable. The means for accessing communication network 34 may therefor be a simple serial bus, or other type of computer based communication card for communicating with the communication network 32. Additionally, a separate data channel may be included in the system to enable a press operator to chat via e-mail or direct transmission of text to a person at the remote site.

As shown in FIG. 2, communication network 32 is connected to the remote unit 18. Remote unit 18 is adapted to accept a signal communicated from electronic processor 20 via communication network 32 and to display the measured quality of the press measured by sensor 12, so that the press 14 may be monitored remotely during a production run of press 14. As shown in FIG. 2, remote unit 18 includes a processor 40 connected to a display means 42. Remote unit may include a printer 44, along with some type of alternate indicator 46. Such alternate indicator may be a warning light, siren, bell, or any other type of indicator to indicate that a signal has been received from local unit 16. The present invention remote unit 18 may comprise a personal computer, such as that of a IBM compatible 46 or Pentium brand programmable computer. Additionally, remote unit 18 may be that of a facsimile machine in which the signal sent from processor 20 via communication network 32 is accepted by the remote unit facsimile device 18 and printed using its printer 44. In another form of the unit remote unit 18 may be that of a personal pager in which the signal generated from processor 20 may be displayed on such electronic pager 18 in the form of a LCD or LED display 42 to indicate to service personnel the particular sensor reading 12 created. Additionally such information communicated from processor 20 to remote unit 18 may include the location of press 14, along with other data regarding the conditions which caused processor 20 to send the signal via communication network 32. In the case when the remote unit is a pager, additionally, there may be a vibrator 48 attached thereto to indicate that a signal has been received from local unit 16. In most industrial applications and area service personnel would not be able to hear any type of audio signal generated by a remote unit 18, but would be able to feel such unit 48 activation.

As shown in FIG. 1, system 10 may include a number of monitoring qualities or function that may be selected. For each function shown, a separate I/O card 24 is normally utilized to condition the signal sent by a particular associated sensor 12.

Such functions include monitoring:

1. Production speed—this function would include a sensor 12 such as a stroke counter to count the number of press cycles per day or per a certain time period. System 10 could also count the number of parts. System could also use a time measurement and calculate press speed. In one preferred embodiment, an infrared sensor applied to portion of press to enable counting of each press stroke.
2. Compression/tensile load factors—this function uses an attached accelerometer and I/O functions on board 24 to measure such acceleration signal to obtain a peak compressive and tensile load measurement. Such information would assist monitoring of the press at low speeds.
3. Vibration severity monitoring—acceleration signals may be utilized to determine the vibration severity of the press application as is known in the art.
4. Discrete component critical vibration monitoring—in this measurement capacity, the press user can apply an accelerometer to a portion of press in which data is desired to be collected;
5. Critical temperature monitor—this function is used to monitor: (1) bearing areas;
   a. oil temperatures;
   b. bed v. slide temperature; and
   c. press temperature stability—temp across press over time and use. Such temperature measurements are useful in ascertaining the production condition of the press. If such temperatures become out of bounds, press operation may be ceased to investigate such out of bounds condition.
6. Critical pressure monitor—this function would use a pressure transducer or the like to generate a pressure signal for oil and/or other pressures that need to be within certain ranges.
7. Motor load monitor—this function would measure current draw of the press motor or can be applied to any other utilized motor, i.e, press feed motor and auxiliary equipment motor. If the current draw climbs, for instance compared to historic levels on such machine, then the motor is working harder for some reason and such occurrence can be investigated.
8. Dynamic shutheight control—in this function, the system 10 would detect shutheight change with a non contact sensor 12 such as an inductive type probe. Changes of shutheight may then be investigated. The ability to maintain a constant shutheight during press operation creates more precise workpieces.
9. Parallelism monitoring—this function—similar to 8, uses two or more preferably inductive probes to determine parallelism of, for instance, press uprights, connections rods, and between the press slide and bolster, etc.
10. Tipping moment monitoring—this function would monitor load on one side of the press compared to another. A strain gauge would be the preferred sensor used for this function.
11. Piston load monitoring—this function would measure total press load or some fraction thereof.
12. Thermal control system monitoring—this functions would measure the effect and efficiency of press heaters and coolers of the press and possibly on the press work pieces.
13. Press percentage utilization monitoring—this function would enable tracking of actual use and operation of the press. A limit switch or other sensor would be utilized for determining that the press was being used. By comparing, or more accurately, dividing by, the actual time used and/or parts produced, a percent of utilization number could be calculated.
14. Feature measuring—this function would measure prototype features on prototype machine and determine how often or when such feature is used. The sensor 12 utilized could be almost any type of sensor depending on the press feature to be monitored.

The present system 10 is preferably programmed through a C++ object oriented language and operated on a IBM compatible, personal computer, such as a 486 or PENTIUM based microprocessor. Other type of electronic processors and computer languages may be equivalently utilized. Standard programming and electronic organizational procedures would enable one of ordinary skill to develop the software to communicate between the hardware utilized.

In the preferred embodiment of the invention, all limits on measurement, device control, routing, alarm limits and preferably any constant or variable is software coded, so the system may be utilized with different hardware and I/O cards for example. In an example a temperature sensor having a DC level output is connected to a National Instruments SCXI-1100 32 channel multiplexer card, to translate the sensor output on line 22 to a numerical signal. A National Instruments SCXI-1001 Mainframe (connected to the above card and other I/O Cards 24) is used to condition the I/O cards 24 output signals to the ISA bus of processor 20. As would be evident to one skilled in the art, other I/O cards, backbone cards, bus structures and processors may be equivalently used. Selection of the programming language and operating system would also be user selectable depending on the total functionality desired.

FIGS. 3A and 3B show an example of a possible typical command set and listing of purpose or function, to enable one skilled in object oriented programming to construct the present system. Later shown in this application is a listing of a sample local software configuration file for the system 10, disclosing a number of variables (measure or controlled in the press environment) that are soft-coded, and therefore, software configurable. Such software configurability of these indicated system variables permits commands or signals from remote unit 18 to reconfigure local unit 16 depending on user desires or requirements now or in the future.

In the preferred embodiment of the invention, a personal computer utilizing a Windows 95 operating system enables organized control objects to be utilized. Further, software developed for use on a remote unit 18 could analyze the measurement signals sent over communication network 32 and conclusions could be drawn of the state of press 12.

Figure 4:
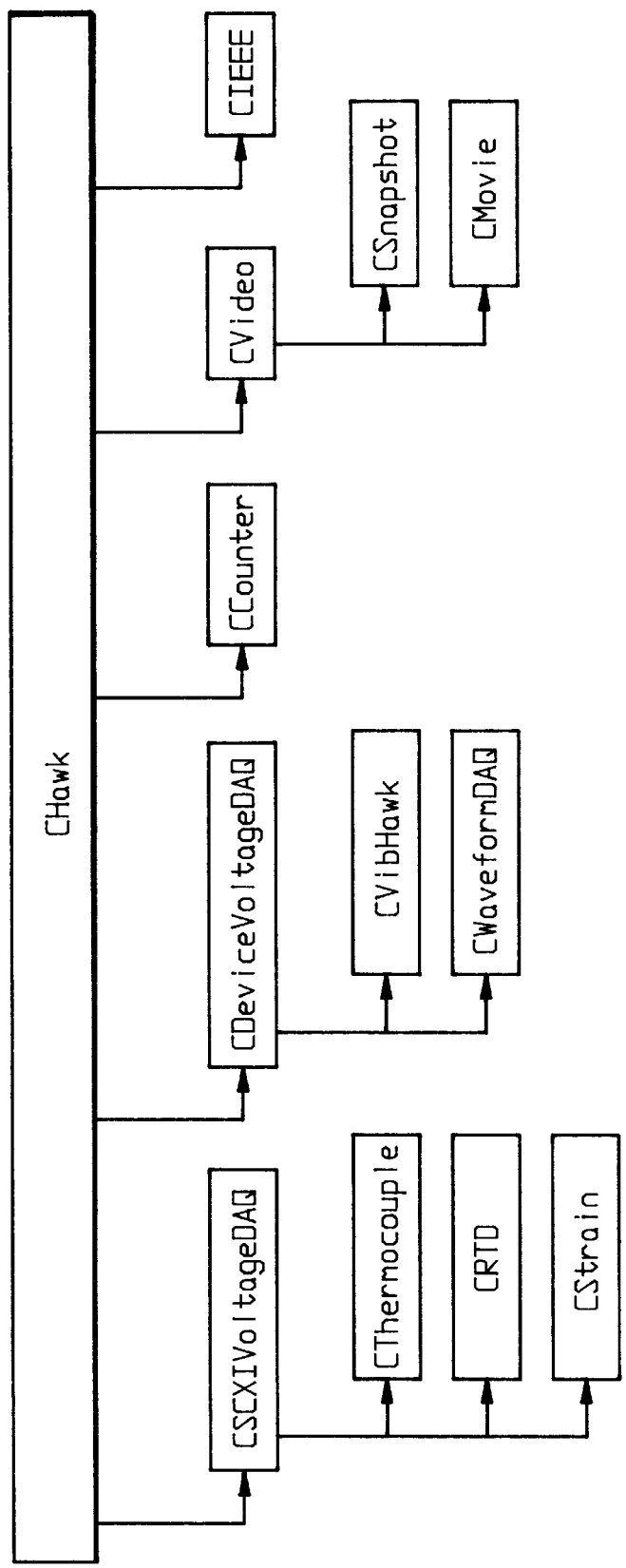
FIG. 4 is a flow chart of the object oriented design of data acquisition system programmed into the electronic processor of the present invention.

FIG. 4 discloses one design for an objected oriented software control program for use with the present invention. Depending on the particular functions selected by the design to monitor, different data acquisition objects can be created, as is known in the art. FIG. 4 shows that almost any type of data, from IEEE protocol format, limit switch counter, Multimedia, DC voltage, AC voltage, waveforms, temperature, strain and others may be captured by local unit 16 for storage in memory 28 or transmission through communication network 32. Depending on the type and amount of data to be sent the software design may use different data transmission protocols as known in the art.

Figure 5:
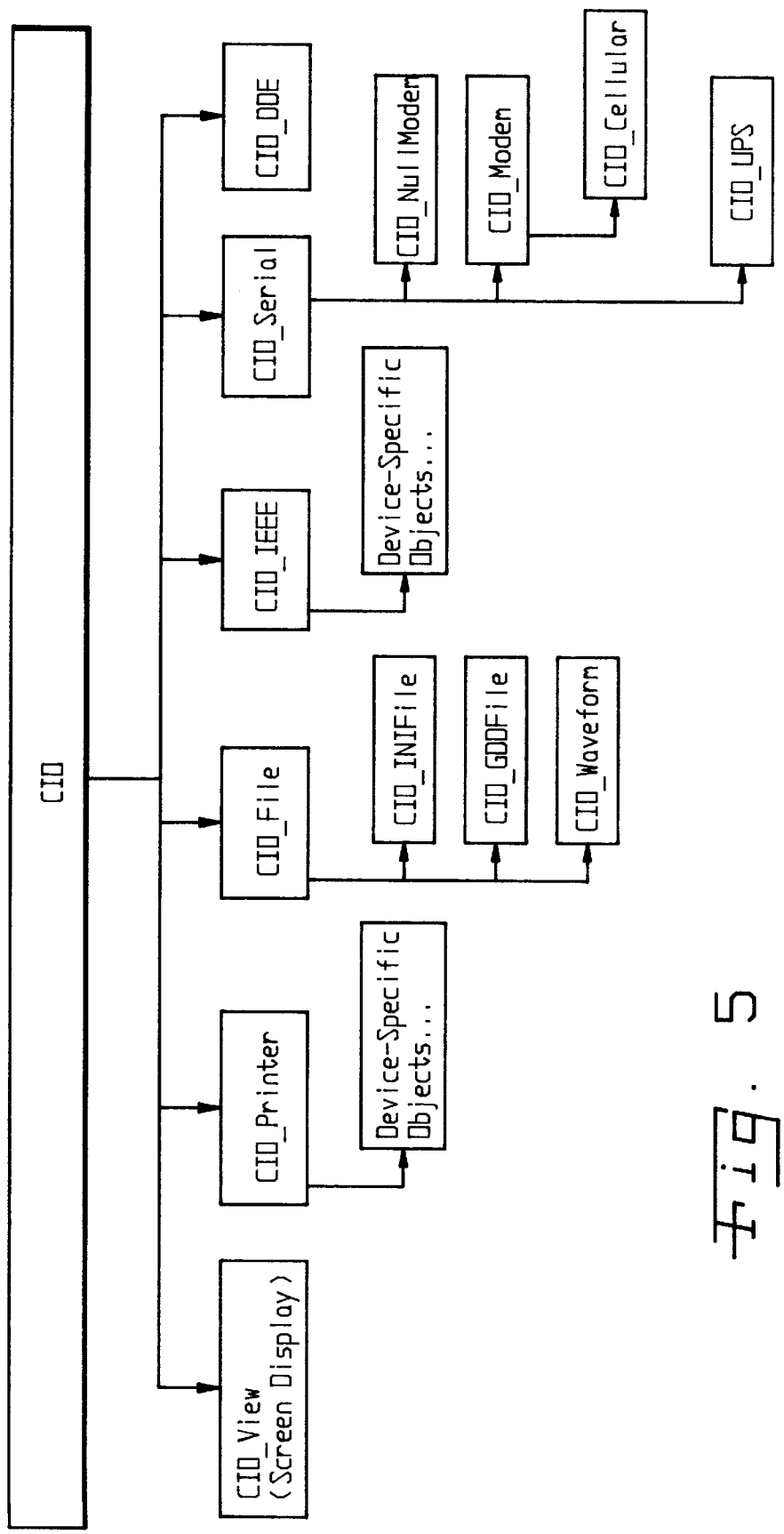
FIG. 5 is a flow chart of the object oriented design regarding the input/output object hierarchy programmed in the processor of the present invention.

FIG. 5 shows an example of an the input/output object oriented software hierarchy that would permit a user to configure the system 10 using the software configuration file (an example of which is shown below). Depending on whether the designer or user wished to store data to memory (Cio_file) or transmit to modem (Cio/Modem), a IEEE Protocol compliant device (Cio_IEEE) or to and through a WINDOWS 95 DDE application, such functionality is possible. Additionally, data logging to a screen and a printer is also possible as shown. From the remote size, the system may also be reconfigured, including setting the time to acquire data along with calibration of the sensors. Calibration may be undertaken on strain gauges, balancing mechanisms (scales), and shutheight measuring devices, for example. Diagnoses of current problems on the press may also be determined and corrections made at the remote size if so equipped.

Figure 6:
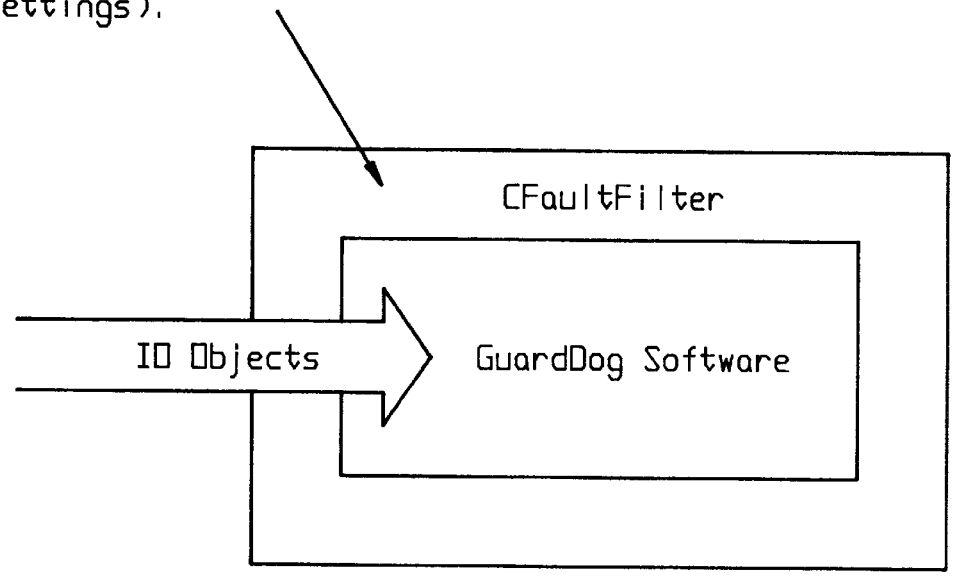
FIG. 6 is a diagrammatic view of the error trapping system of the present invention.
Figure 7:
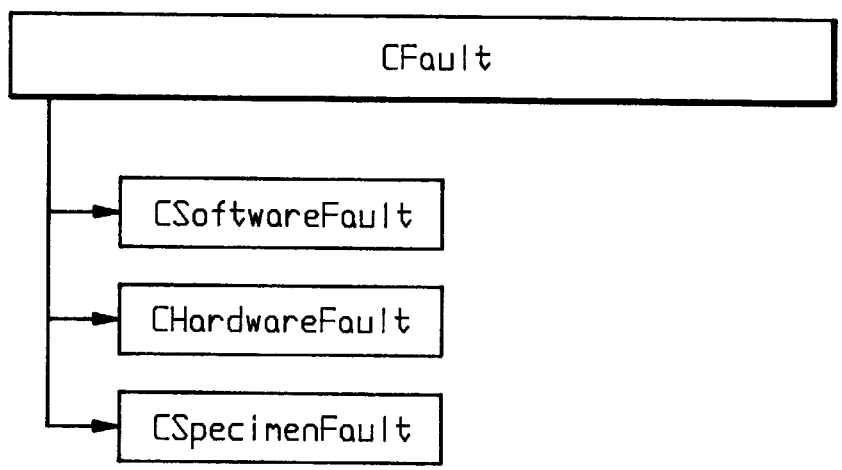
FIG. 7 is a flow chart of the object oriented design on the fault protection sub-system.

FIGS. 6 and 7 disclose a programmed object found in the software that controls processor 20 of that of a Faultfilter. This object, using constructs normal to object oriented programming, would permit trapping of fault conditions and logging (saving to memory) or transmittal (through communication network 32) of such conditions for current or latter study and use.

The system and method further include the functions described as advantages related above. By using object oriented design and the local software configuration file disclosed below, the local unit 16 may at times be reconfigured by use of signals from remote unit 18. System 10 then has an electronic processor which includes a means for fault checking to create a status code. As shown in the software configuration file, and known in the art, therefore the processor has a number of reconfigurable predetermined settings. The processor 20 may access the communication network 32 and send a signal to remote unit 18 when a status code is outside of a predetermined limit. At that time, or an any other time, remote unit 18 is adapted to communicate through communication network 32 and alter the predetermined settings associated with the electronic processor 20 and system 10. Such reconfiguration may eliminate the fault condition found. Reconfiguration by remote unit 18 may also change the data acquisition characteristics of system 10 by turning off or on certain sensors, I/O boards, or other units.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

```
[DISPLAY]
Format=Text
[FILES]
Logger_File=1B153801.WDD
AutoIndexIncrement=ON
AutoConditionIncrement=OFF
[TRIGGERS]
AutoStartOnBoot=ON
LogTrigger=TIMER OR FAULT
[TIMERS]
LogTimer=60
PeakTimer=250
[SERVICES]
Temperatures=ON
Strain_Gages=ON
SCXI_Voltage_Inputs=ON
Counters=ON
PeakHold_Inputs=OFF
Device_Voltage_Inputs=OFF
VibHawk_Inputs=OFF
[Temperatures]
Scale=Fahrenheit
DAQ_Device=1
SCXI_Chassis=1
Sample_Rate=1000
Scan_Rate=0
Samples_per_Channel=10
Number_of_Modules=1
Module1_SlotNumber=1
Module1_Gain=1000
Module1_StartChannel=0
Module1_Number_of_Channels=30
Peak_Detect=OFF
[Strain_Gages]
DAQ_Device=1
SCXI_Chassis=1
Sample_Rate=1000
Scan_Rate=0
Samples_per_Channel=10
Number_of_Modules=3
Module1_SlotNumber=1
Module1_Gain=1000
Module1_StartChannel=0
Module1_Number_of_Channels=30
Module2_SlotNumber=1
Module2_Gain=1000
Module2_StartChannel=0
Module2_Number_of_Channels=30
Module3_SlotNumber=1
Module3_Gain=1000
Module3_StartChannel=0
Module3_Number_of_Channels=30
Peak_Detect=ON
[SCXI_Voltage_Inputs]
DAQ_Device=1
```

```
SCXI_Chassis=1
Sample_Rate=1000
Scan_Rate=0
Samples_per_Channel=10
Number_of_Modules=2
Module1_SlotNumber=2
Module1_Gain=1000
Module1_StartChannel=0
Module1_Number_of_Channels=4
Module2_SlotNumber=3
Module2_Gain=1000
Module2_StartChannel=0
Module2_Number_of_Channels=4
Peak_Detect=ON
[Counters]
DAQ_Device=2
32Bit_Counters=ON
Number_of_Channels=1
Peak_Detect=ON
[Device_Voltage_Inputs]
DAQ_Device=1
Sample_Rate=1000
Scan_Rate=0
Samples_per_Channel=10
StartChannel=1
Number_of_Channels=7
Peak_Detect=ON
[VibHawk_Inputs]
DAQ_Device=1
Sample_Rate=1000
Scan_Rate=0
Samples_per_Channel=10
StartChannel=1
Number_of_Channels=7
Peak_Detect=ON
[Device1]
Channe10_Status=ON
Channe10_Title=Chassis1
Channe10_Units=Volts
Channe10_Slope=1
Channe10_Offset=0
Channe10_Gain=1
[Device2]
Channel1_Status=ON
Channel1_Title=CRH_150
Channel1_Slope=1
Channel1_Offset=0
[Module 1]
Module_Type=1100
Terminal_Block=1303
Channel0_Status=ON
Channel0_Title=(T1)Far_Right_Crank_Brg
Channel0_Units=degF
Channel0_Slope=1
Channel0_Offset=0
Channel1_Status=ON
Channel1_Title=(T2)Outer_Right_US_Crank_Brg
Channel1_Units=degF
Channel1_Slope=1
Channel1_Offset=0
Channel2_Status=ON
Channel2_Title=(T3)Inner_Right_US_Crank_Brg
Channel2_Units=degF
Channel2_Slope=1
Channel2_Offset=0
Channel3_Status=ON
Channel3_Title=(T4)Outer_Right_LS_Crank_Brg
Channel3_Units=degF
Channel3_Slope=1
Channel3_Offset=0
Channel4_Status=ON
Channel4_Title=(T5)Inner_Right_LS_Crank_Brg
Channel4_Units=degF
Channel4_Slope=1
Channel4_Offset=0
Channel5_Status=ON
Channel6_Title=(T6)Middle_Right_Crank_Brg
Channel5_Units=degF
Channel5_Slope=1
Channel5_Offset=0
Channel6_Status=ON
Channel6_Title=(T7)Middle_Left_Crank_Br#
Channel6_Units=degF
Channel6_Slope=1
Channel6_Offset=0
Channel7_Status=ON
Channel7_Title=(T8)Inner_Left_LS_Crank_Brg
Channel7_Units=degF
Channel7_Slope=1
Channel7_Offset=0
Channel8_Status=ON
Channel8_Title=(T9)Outer_Left_LS_Crank_Brg
Channel8_Units=degF
Channel8_Slope=1
Channel8_Offset=0
Channel9_Status=ON
Channel9_Title=(T10)Inner_Left_US_Crank_Brg
Channel9_Units=degF
Channel9_Slope=1
Channel9_Offset=0
Channel10_Status=ON
Channel10_Title=(T11)Outer_Left_US_Crank_Brg
Channel10_Units=degF
Channel10_Slope=1
Channel10_Offset=0
Channel11_Status=ON
Channel11_Title=(T12)Far_Left_Crank_Brg
Channel11_Units=degF
Channel11_Slope=1
Channel11_Offset=0
Channel12_Status=ON
Channel12_Title=(T13)RR_Right_Rocker_Brg
Channel12_Units=degF
Channel12_Slope=1
Channel12_Offset=0
Channel13_Status=ON
Channel13_Title=(T14)RR_Left_Rocker_Brg
Channel13_Units=degF
Channel13_Slope=1
Channel13_Offset=0
Channel14_Status=ON
Channel14_Title=(T15)LR_Right_Rocker_Brg
Channel14_Units=degF
Channel14_Slope=1
Channel14_Offset=
Channel15_Status=ON
Channel15_Title=(T16)LR_Left_Rocker_Brg
Channel15_Units=degF
Channel15_Slope=1
Channel15_Offset=0
Channel16_Status=ON
Channel16_Title=(T17)RF_Right_Rocker_Brg
Channel16_Units=degF
Channel16_Slope=1
Channel16_Offset=0
Channel17_Status=ON
Channel17_Title=(T18)RF_Left_Rocker_Brg
Channel17_Units=degF
Channel17_Slope=1
Channel17_Offset=0
Channel18_Status=ON
Channel18_Title=(T19)LF_Right_Rocker_Brg
Channel18_Units=degF
Channel18_Slope=1
Channel18_Offset=0
Channel19_Status=ON
Channel19_Title=(T20)LF_Left_Rocker_Brg
Channel19_Units=degF
Channel19_Slope=I
Channel19_Offset=0
Channel20_Status=ON
Channel20_Title=(T21)RR_US_Piston_Hsg
Channel20_Units=degF
Channel20_Slope=1
Channel20_Offset=0
Channel21_Status=ON
Channel21_Title=(T22)RF_US_Piston_Hsg
Channel21_Units=degF
```

-continued

```
Channel21_Slope=1
Channel21_Offset=0
Channel22_Status=ON
Channel22_Title=(T23)Rear_Outer_Right_Gib
Channel22_Units=degF
Channel22_Slope=1
Channel22_Offset=0
Channel23_Status=ON
Channel23_Title=(T24)Rear_Inner_Right_Gib
Channel23_Units=degF
Channel23_Slope=1
Channel23_Offset=0
Channel24_Status=ON
Channel24_Title=(T25)RearInner_Left_Gib
Channel24_Units=degF
Channel24_Slope=1
Channel24_Offset=0
Channel25_Status=ON
Channel25_Title=(T26)Rear_Outer_Left_Gib
Channel25_Units=degF
Channel25_Slope=1
Channel25_Offset=0
Channel26_Status=ON
Channel26_Title=(T27)LR_US_Piston_Hsg
Channel26_Units=degF
Channel26_Slope=1
Channel26_Offset=0
Channel27_Status=ON
Channel27_Title=(T28)LF_US_Piston_Hsg
Channel27_Units=degF
Channel27_Slope=1
Channel27_Offset=0
Channel28_Status=ON
Channel28_Title=(T29)Left_US_Balancer
Channel28_Units=degF
Channel28_Slope=1
Channel28_Offset=0
Channel29_Status=ON
Channel29_Title=(T30)Ambient
Channel29_Units=degF
Channel29_Slope=1
Channel29_Offset=0
[Module2]
Module_Type=1121
Terminal_Block=1321
Channel0_Status=ON
Channel0_Title=(S1)LS_LH_Connection
Channel0_Units=mv
Channel0_Slope=1000
Channel0_Offset=0
Channel1_Status=ON
Channel1_Title=(S2)LS_LR_Short_Link
Channel1_Units=mv
Channel1_Slope=1000
Channel1_Offset=0
Channel2_Status=ON
Channel2_Title=(S3)LS_LR_Rocker_Arm
Channel2_Units=mv
Channel2_Slope=1000
Channel2_Offset=0
Channel3_Status=ON
Channel3_Title=(S4)LS_LR_Long_Link
Channel3_Units=mv
Channel3_Slope=1000
Channel3_Offset=0
[Module3]
Module_Type=1121
Terminal_Block=1321
Channel0_Status=ON
Channel0_Title=(S11)LS_Bal_RR_Corner
Channel0_Units=mv
Channel0_Slope=1000
Channel0_Offset=0
Channel1_Status=ON
Channel1_Title=(S12)LS_Bal_LR_Corner
Channel__Units=mv
Channel1_Slope=1000
Channel1_Offset=0
Channel2_Status=ON
```

-continued

```
Channel2_Title=(S13)LS_Bal_Pivot_Support_Wall
Channel2_Units=mv
Channel2_Slope=1000
Channel2_Offset=0
Channel3_Status=ON
Channel3_Title=(S14)US_LH_CrossHead
Channel3_Units=mv
Channel3_Slope=1000
Channel3_Offset=0
[Module4]
Module_Type=1121
Terminal_Block=1321
[Module5]
Module_Type=1121
[Module6]
Module_Type=Empty
[Module7]
Module_Type=Empty
[Module8]
Module_Type=Empty
[Module9]
Module_Type=Empty
[Module10]
Module_Type=Empty
[Module11]
Module_Type=Empty
[Module12]
Module_Type=1162
Terminal_Block=1326
[Recent File List]
File1=C:544 1559544 1e155904.wdd
```

What is claimed is:

1. A press monitoring system comprising:
an electronic processor;
means for accessing a communication network connected to said processor;
a sensor for measuring a desired quality of the press, said sensor connected to said electronic processor and capable of sending a signal thereto, said electronic processor adapted to send a signal over said communication network corresponding to said measured quality; and
a remote unit connected to said communication network, said remote unit adapted to accept said signal from said electronic processor and to display said measured quality of the press whereby the press may be monitored remotely during a production run of the press.

2. The system of claim 1 in which said electronic processor includes memory means for storing the value of signals received from said sensor over a time period longer than twenty four hours.

3. The system of claim 1 in which said electronic processor includes memory means for storing the value of signals received from said sensor over a time period longer than seven days.

4. The system of claim 1 in which said electronic processor includes a comparitor means for determining whether said signal from said sensor is within predetermined limits, said processor accessing the communication network and sending a signal to said remote unit when said signal from said sensor is outside said predetermined limits.

5. The system of claim 4 in which said remote unit is adapted to communicate through the communication network and alter said predetermined limits associated with said comparitor means.

6. The system of claim 1 in which said electronic processor includes a means for fault checking to create a status code, said processor having a number of reconfigurable predetermined settings, said processor accessing the communication network and sending a signal to said remote unit when said status code is outside of a predetermined limit.

7. The system of claim 6 in which said remote unit is adapted to communicate through the communication network and alter said predetermined settings associated with said electronic processor to clear such checked fault.

8. The system of claim 1 in which said remote unit is adapted to communicate through the communication network and alter and command said electronic processor to change the state a sensor from on to off.

9. The system of claim 1 further comprising a press from which said sensor measures a desired quality.

10. The system of claim 1 in which said electronic processor includes timing means for determining a predefined time period, said electronic processor after said predefined time period accessing the communication network to send a signal to said remote network.

11. The system of claim 10 in which said remote unit is adapted to communicate through the communication network to said electronic processor and alter said predefined time period associated with said timing mean.

12. The system of claim 1 in which said means for accessing the communication network comprises a modem.

13. The system of claim 1 in which said remote unit is a personal computer.

14. The system of claim 1 in which said remote unit is a facsimile machine, said signal sent by said electronic processor interpreted and then printed by said facsimile.

15. The system of claim 1 in which said remote unit is a personal pager.

16. The system of claim 15 in which said signal send by said electronic processor is interpreted by said personal pager which then displays the measured desired quality of the press.

17. The system of claim 15 in which said signal send by said electronic processor is interpreted by said personal pager which then displays the location of the press measured by said sensor.

18. The system of claim 1 in which said electronic processor includes memory means to store the value of signals received from said sensor, said remote unit adapted to communicate through the communication network to said electronic processor and command said electronic processor to alter the frequency of storing said signals from said sensor to said memory means.

19. The system of claim 1 in which said remote unit includes memory means to store said accepted signals and means to sort and display said stored accepted signals according to user selected criteria.

20. A method of monitoring a stamping press during a production run, said method including the steps of:

providing an electronic processor and a sensor for respectively acquiring data and measuring a desired quality of the press;

providing access to a communication network connected to a remote unit for displaying an indication of the measured quality of the press;

measuring the desired quality of the press;

operating said electronic processor to send a signal over the communication network representative of the measured quality of the press whereby said remote unit receives said signal.

21. The method of claim 20 further comprising the step of causing said remote unit to send a signal though said communication network to said electronic processor that commands said electronic processor to change its rate of acquiring data.

22. The method of claim 20 further comprising the step of printing a report regarding said measured quality with said remote unit based upon said received signal.

23. The method of claim 20 further comprising the step of activating a vibrator with said remote unit based upon said received signal.

24. A press and monitoring system, comprising:

a mechanical press;

an electronic processor;

means for accessing a communication network connected to said processor;

a sensor for measuring a desired quality of said press, said sensor connected to said electronic processor and capable of sending a signal thereto, said electronic processor adapted to send a signal over said communication network corresponding to said measured quality; and a remote unit connected to said communication network, said remote unit adapted to accept said signal from said electronic processor and to display said measured quality of said press whereby said press may be monitored remotely during a production run of the press.

25. The system of claim 24 in which said electronic processor includes memory means to store the value of signals received from said sensor over a period longer than twenty four hours.

26. The system of claim 24 in which said electronic processor includes memory means to store the value of signals received from said sensor over a period longer than seven days.

27. The system of claim 24 in which said electronic processor includes a comparitor means for determining whether said signal from said sensor is within predetermined limits, said processor accessing the communication network and sending a signal to said remote unit when said signal from said sensor is outside said predetermined limits.

28. The system of claim 27 in which said remote unit is adapted to communicate through the communication network and alter said predetermined limits associated with said comparitor means.

* * * * *

UNITED STATES PATENT AND TRADEMARK OFFICE
Certificate

Patent No. 6,122,565                                                                 Patented: September 19, 2000

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Nathan P. Wenning, Coldwater, OH; Daniel Schoch, Minster, OH; and Kevin J. Evers, Fort Recovery, OH.

Signed and Sealed this Twenty-Sixth Day of November 2002.

JOHN FOLLANSBEE
*Supervisory Patent Examiner*
Art Unit 2127